(12) United States Patent
Qin et al.

(10) Patent No.: US 11,451,604 B2
(45) Date of Patent: Sep. 20, 2022

(54) VIDEO TRANSCODING METHOD AND APPARATUS, A SERVER SYSTEM, AND STORAGE MEDIUM

(71) Applicant: TENCENT TECHNOLOGY (SHENZHEN) COMPANY LIMITED, Shenzhen (CN)

(72) Inventors: Zhi Qin, Shenzhen (CN); Guimin Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 154 days.

(21) Appl. No.: 16/428,238

(22) Filed: May 31, 2019

(65) Prior Publication Data

US 2019/0320002 A1 Oct. 17, 2019

Related U.S. Application Data

(63) Continuation of application No. PCT/CN2018/098530, filed on Aug. 3, 2018.

(30) Foreign Application Priority Data

Aug. 3, 2017 (CN) .......................... 201710656886.9

(51) Int. Cl.
*H04L 29/06* (2006.01)
*H04N 21/234* (2011.01)
(Continued)

(52) U.S. Cl.
CPC ........... *H04L 65/70* (2022.05); *H04N 21/234* (2013.01); *H04N 21/2343* (2013.01); *H04N 21/845* (2013.01)

(58) Field of Classification Search
CPC ................ H04L 65/607; H04N 21/234; H04N 21/2343; H04N 21/845
See application file for complete search history.

(56) References Cited

U.S. PATENT DOCUMENTS 9,338,467 B1 5/2016 Gadepalli et al.
2002/0150247 A1 10/2002 Linnartz et al.
(Continued)

FOREIGN PATENT DOCUMENTS

CN 101459848 A 6/2009
CN 104021507 A 9/2014
(Continued)

OTHER PUBLICATIONS

International Search Report dated Oct. 9, 2018 in WIPO Patent Application No. PCT/CN2018/098530 with translation.
(Continued)

*Primary Examiner* — Jefferey F Harold
*Assistant Examiner* — Franklin S Andramuno
(74) *Attorney, Agent, or Firm* — Arentfox Schiff LLP

(57) ABSTRACT

Aspects of the disclosure provide a method and a server system for transcoding a video source file into multiple target formats. The server system includes a first server configured to receive a first video chunk of the video source file and first attribute parameters corresponding to the first video chunk and a first target format of the multiple target formats where the first video chunk is transcoded into the (Continued)

first target format. The first attribute parameters include a first precoding parameter for the first video chunk and a first coding parameter for the first target format. The first server can process the first video chunk according to the first precoding parameter to obtain a first intermediate coding result and code the first intermediate coding result according to the first coding parameter to obtain a first final coding result in the first target format and output the first final coding result.

18 Claims, 5 Drawing Sheets

(51) Int. Cl.
*H04N 21/845* (2011.01)
*H04N 21/2343* (2011.01)
*H04L 65/70* (2022.01)

(56) References Cited

U.S. PATENT DOCUMENTS

| | | | | |
|---|---|---|---|---|
| 2012/0185693 | A1* | 7/2012 | Chen | H04N 21/41407 |
| | | | | 713/168 |
| 2014/0129825 | A1 | 5/2014 | Losev et al. | |
| 2014/0139733 | A1 | 5/2014 | MacInnis et al. | |
| 2014/0208374 | A1* | 7/2014 | Delaunay | H04L 65/605 |
| | | | | 725/109 |
| 2015/0249848 | A1* | 9/2015 | Holman | H04N 21/6582 |
| | | | | 348/469 |
| 2016/0156948 | A1* | 6/2016 | Yang | H04N 19/593 |
| | | | | 725/116 |

FOREIGN PATENT DOCUMENTS

| | | |
|---|---|---|
| CN | 104349175 A | 2/2015 |
| CN | 104581202 A | 4/2015 |
| CN | 104639861 A | 5/2015 |
| CN | 105407381 A | 3/2016 |
| WO | 02085027 A1 | 10/2002 |

OTHER PUBLICATIONS

Written Opinion dated Oct. 9, 2018 in WIPO Patent Application No. PCT/CN2018/098530.
Chinese Office Action dated Feb. 2, 2021, in Patent Application No. 201710656886.9 (with partial English translation), 10 pages.
Extended European Search Report issued in Application No. 18840969.2 dated May 6, 2020, 9 pages.
Supplementary European Search report dated May 28, 2020 in Application No. 18840969.2, 1 page.
European Office Action dated Nov. 8, 2021, Application No. 18-840-969.2-1213, (9 pages).

* cited by examiner

VIDEO TRANSCODING METHOD AND APPARATUS, A SERVER SYSTEM, AND STORAGE MEDIUM

RELATED APPLICATION

This application is a continuation of International Application No. PCT/CN2018/098530, filed on Aug. 3, 2018, which claims priority to Chinese Patent Application No. 201710656886.9, filed on Aug. 3, 2017. The entire disclosures of the prior applications are hereby incorporated by reference in their entirety

FIELD OF THE TECHNOLOGY

Embodiments of the present disclosure relate to the field of Internet technologies.

BACKGROUND OF THE DISCLOSURE

As network bandwidth and terminal devices develop, the quantity of network video users rapidly increases, and currently, watching a network video has become a first choice for relaxing and entertainment for more users. Due to different network environments, terminal types, and formats of uploaded video content, videos on a video website need to be transcoded before being posted online, to output videos of a plurality of definitions to adapt to requirements of various networks and terminal environments.

During play back, users usually switch resolutions due to different network environments. If multi-resolution instantaneous decoding refresh (IDR) alignment transcoding is implemented, the resolution can be seamlessly switched without a black screen during resolution switching, thereby achieving better user experience.

SUMMARY

Embodiments of the present disclosure provide a video transcoding method and apparatus, a server, and a readable storage medium. Aspects of the disclosure provide a method and a server system for transcoding a video source file into multiple target formats. The server system includes a first server configured to receive a first video chunk of the video source file and first attribute parameters corresponding to the first video chunk and a first target format of the multiple target formats where the first video chunk is to be transcoded into the first target format. The first attribute parameters include a first precoding parameter for the first video chunk and a first coding parameter for the first target format. The first server processes the first video chunk according to the first precoding parameter for the first video chunk to obtain a first intermediate coding result. The first server codes the first intermediate coding result according to the first coding parameter for the first target format to obtain a first final coding result in the first target format and output the first final coding result.

In an embodiment, before obtaining the first video chunk, the server system divides the video source file into multiple video chunks that, include the first video chunk. Further, the server system generates a plurality of transcoding tasks according to the multiple video chunks and the multiple target formats. Each of the plurality of transcoding tasks is used for transcoding one of the multiple video chunks according to attribute parameters that correspond to the one of the multiple video chucks and one of the multiple target formats.

In an embodiment, the server system includes a second server configured to receive a second video chunk of the multiple video chunks and second attribute parameters of the attribute parameters corresponding to the second video chunk and the first target format where the second video chunk is to be transcoded into the first target format. The second attribute parameters include a second precoding parameter for the second video chunk and the first coding parameter for the first target format. The second server processes the second video chunk according to the second precoding parameter for the second video chunk to obtain a second intermediate coding result. The second server codes the second intermediate coding result according to the first coding parameter for the first target format to obtain a second final coding result and output the second final coding result.

In an embodiment, the server system includes a second server configured to receive the first video chunk and second attribute parameters for the first video chunk and a second target format of the multiple target formats where the first video chunk is to be transcoded into the second target format. The second attribute parameters include the first precoding parameter for the first video chunk and a second coding parameter for the second target format. The second server processes the first video chunk according to the first precoding parameter for the first video chunk to obtain the first intermediate coding result. The second server codes the first intermediate result according to the second coding parameter for the second target format to obtain a second final coding result and outputs the second final coding result.

In an embodiment, a merging task is generated when the multiple video chunks have been transcoded according to the first target format where the merging task includes final coding results corresponding to the first target format, target format information of the first target format, and time information of the multiple video chunks. The final coding results include the first and second final coding results. In an example, the merging task is received, the final coding results are merged according to the time information to obtain a target video file in the first target format, and the target video file is output.

In an embodiment, a precoding parameter is determined for each of the multiple video chunks according to an identifier of the respective video chunk. A coding parameter for each of the multiple target formats is determined according to the respective target format. Each of the plurality of transcoding tasks is generated according to the precoding parameter, the coding parameter corresponding to the respective target format, and the respective video chunk. In an example, position information of the respective video chunk in the video source file is determined according to the identifier of the respective video chunk, and the precoding parameter of the respective video chunk is determined according to the position information. Further, a precoding code rate and a customized parameter for processing the video source file are obtained where the customized parameter includes at least one of: a video opening-credit file, a video closing-credit file, and watermark information. For example, the precoding code rate, the video opening-credit file, and the watermark information can be determined as the precoding parameter of the respective video chunk when the respective video chunk is determined to be the first of the multiple video chunks according to the position information. The precoding code rate, the video closing-credit file, and the watermark information can be determined as the precoding parameter of the respective video chunk when the respective video chunk is determined to be the last of the multiple video chunks according to the position information. The precoding code rate and the watermark information can be determined as the precoding parameter of the respective video chunk when the respective video chunk is determined not to be the first or the last of the multiple video chunks according to the position information.

Aspects of the disclosure also provide a non-transitory computer-readable storage medium storing instructions which when executed by one or more processors cause the one or more processors to perform the transcoding method.

The embodiments of the present disclosure provide the video transcoding method and apparatus, the server, and the non-transitory computer-readable storage medium. First, the to-be-transcoded video fragment and the attribute parameter for transcoding are determined. The attribute parameter for transcoding includes the precoding parameter and the coding parameter corresponding to the target definition. Then, the to-be-transcoded video fragment is precoded according to the precoding parameter, to obtain the first coding result; and the first precoding result is coded according to the coding parameter corresponding to the target definition, to obtain the second coding result. Finally, the second coding result is output. Accordingly, first-phase precoding and second-phase coding for definitions are performed on the video fragment on the same transcoding server, to obtain a transcoding result, and a plurality of transcoding servers performs precoding and coding concurrently, so that on the premise that a task processing concurrency degree is ensured, a video transcoding speed can be improved, and content of different definitions of the same video are output in an IDR alignment manner.

DESCRIPTION OF EMBODIMENTS

Figure 1:
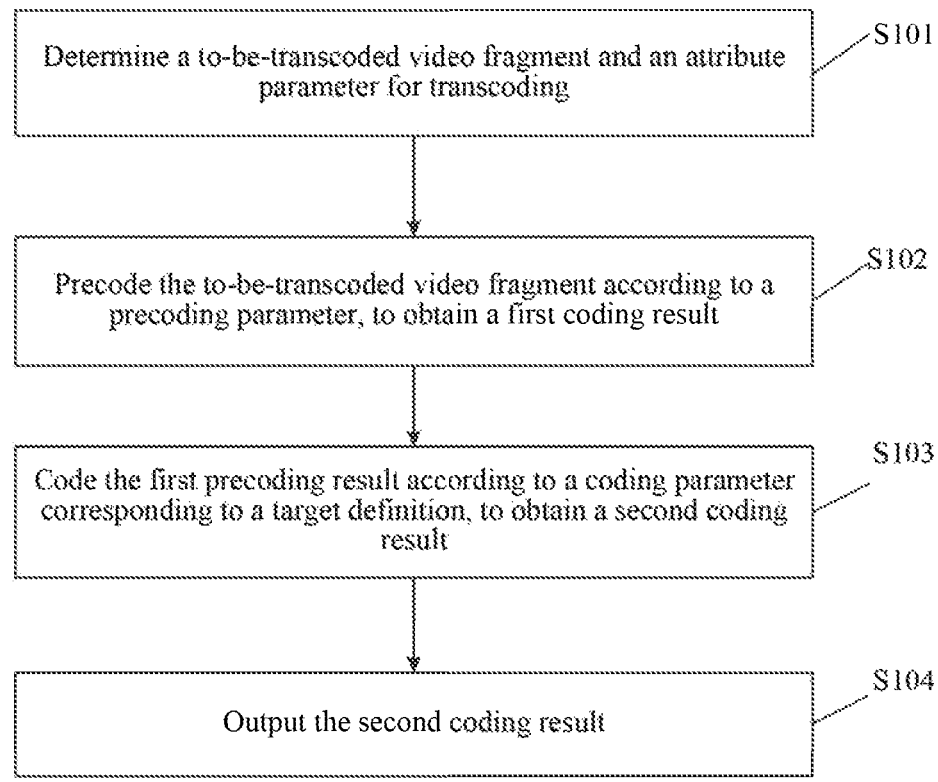
FIG. 1 is a schematic diagram of an implementation process of a video transcoding method according to an embodiment of the present disclosure.

To make technical solutions and advantages of the embodiments of the present disclosure clearer, the following further describes the specific technical solutions of the present disclosure in detail with reference to the accompanying drawings in the embodiments of the present disclosure. The following embodiments are not intended to limit the scope of the present disclosure.

To better understand the embodiments of the present disclosure, a code rate, a frame rate, and a resolution, and mutual relationships thereof are described herein. For example, code rate can refer to the quantity of data bits transmitted in a unit of time during data transmission, generally in a unit of kilobits per second (kilobits per second, kbps). The code rate is commonly understood as a sampling rate. A higher sampling rate in a unit of time indicates a higher precision, so that a processed file is closer to an original file, that is, details on an image are more abundant.

Frame rate can refer to the quantity of pictures displayed per second. The frame rate influences image fluency (or image smoothness) and is in direct proportion to the image fluency: A higher frame rate indicates more fluent images. A lower frame rate indicates the images may have a sense of jitter. Due to a special physiological structure of human eyes, if a frame rate of images seen by the human eyes is higher than 16, the images are considered to be continuous. Such a phenomenon is referred to as persistence of vision. Moreover, in some examples, after a frame rate reaches a particular value, it is not easy for human eyes to perceive an obvious increase in the fluency even if the frame rate further increases.

Resolution can refer to the length and width of a (rectangular) picture, that is, a dimension of the picture.

"Clear" which is used in the description can refer to an image that is fine and does not have a mosaic. A higher resolution does not necessarily indicate a clearer image. For brevity, in a case of a particular code rate, the resolution is in inverse proportion to the definition. For example, a higher resolution indicates a blurrier image, and a lower resolution indicates a clearer image. In a case of a particular resolution, the code rate is in direct proportion to the definition. For example, a higher code rate indicates a clearer image; and a lower code rate indicates a blurrier image. However, in fact, this is not necessarily the case. In other words, in a case of a particular code rate, an image is clear if the resolution corresponds to values within a particular range. Similarly, in a case of a particular resolution, an image is clear if the code rate corresponds to values within a particular range.

Video quality can be reflected in a subjective and an objective way. The subjective way is a video definition which is usually mentioned by people. In daily life, a definition level is usually used to measure the video quality, for example, a first definition level, a second definition level, a third definition level, and a fourth definition level. For example, standard definition, high definition, super high definition, blu-ray, and the like that people usually mention are definition levels. An objective parameter is a quantized parameter or a compression rate or a code rate. Each definition corresponds to a particular code rate. Compared with the same video source file and compression algorithm, the quantized parameter, the compression rate, and the code rate are in direct proportion to each other.

High definition and super high definition typically refer to a high resolution (HD) and a super high resolution (SHD). Standard definition has a resolution of 640*480 pixels, high definition has a resolution of 720*576 pixels, super high definition has a resolution greater than 720*576 pixels, and a commonly mentioned 720P resolution is 1280*720 pixels, and a 1080P resolution is 1920*1080 pixels.

An embodiment of the present disclosure provides a video transcoding method. FIG. 1 is a schematic diagram of an exemplary implementation process of the video transcoding method. In an example, a video source file is to be transcoded into multiple preset target formats. As shown in FIG. 1, the method includes:

In step S101, determine a to-be-transcoded video fragment (or a video chunk that is to be transcoded) and an attribute parameter for transcoding. The video source file includes the video fragment.

It may be understood that, the attribute parameter for transcoding is an attribute parameter corresponding to a transcoding task, and may also be referred to as an attribute parameter corresponding to the to-be-transcoded video fragment.

Herein, step S101 may be performed by a server. In an embodiment, the server may be a transcoding server. In other embodiments, the server may also be a task server, a fragmentation server, and/or a merging server.

The attribute parameter for transcoding can include a coding parameter corresponding to a target format, such as a target definition, and a precoding parameter. In an example, the attribute parameter corresponds to the video fragment to be transcoded and the target format. The target format can include a target definition, and thus, the coding parameter can correspond to the target definition. The coding parameter corresponding to the target definition may be a code rate corresponding to the target definition. The precoding parameter may include but is not limited to: a precoding code rate, watermark information, video opening-credit file information, video closing-credit file information, interstitial advertisement video file information, a marquee parameter, and the like. The watermark information may include: a number of an added watermark file, and a file path for added position information. The video opening-credit file information may include: a path of a video opening-credit file and a file number. The video closing-credit file information may include: a path of a video closing-credit file and a file number. The interstitial advertisement video file information may include a path of an interstitial advertisement file, a file number, and a time point for inserting the advertisement to the video. The marquee parameter may include: a path of a marquee file, a file number, position information, and a cyclic policy.

The precoding parameter may further include a blocking parameter, and during actual implementation, the blocking parameter may include a blocking position and a blocking form. For example, if a station caption of a television station needs to be blocked in a video, a position of the station caption of the television station in a video image may be determined as the blocking position, and the blocking form may be covering the position with mosaics or blurring the position, to avoid a dispute over copyright or protect privacy.

A video source file according to some embodiments refers to a video not including opening credits and closing credits, which is commonly described as a "feature film". An added watermark may be a logo of a producer or a publisher, and may be, for example, "X-cent video" and "X-ku video". An added marquee may be a passage or a sentence, and may be, for example, "For more interesting videos, please follow the official account "Like watching American TV series"".

The following explains video transcoding and distributed transcoding.

Currently, for different service requirements, there is a plurality of video coding standards. Exemplary video coding standards include the H.263 standard for a video telephony and video conference service in the multimedia technologies; the MPEG2 standard for digital video broadcasting (DVB), high definition television (HDTV) technologies, and digital versatile disc (DVD) in the multimedia technologies; the MPEG4 standard for a network streaming media service in the multimedia technologies; and a network-friendly H.264 coding manner that can provide high video-compression performance. Owing to a variety of coding manners, there is a variety of video files. Generally, after compression coding is performed on a video file according to different standards, the video file needs to be communicated in different environment media, and displayed on different terminals for broadcasting. In an example, video streams on which the compression coding has been performed need to be transcoded. The video transcoding means to convert an original uncompressed video bitstream or a compressed video bitstream into a video bitstream (whose format may include a code rate, a frame rate, a spatial resolution, and a used coding algorithm of a video) of another format, to adapt to different network bandwidths, different terminal processing capabilities, and different user requirements. Essentially, transcoding is a process of first decoding and then coding. Therefore, bitstreams before or after the conversion may comply with the same video coding standard, or may not comply with the same video coding standard.

Since video transcoding can use a large amount of computing resources and take a long time, the video transcoding occupies a considerably large amount of CPU resources. Generally, video transcoding work is done on a dedicated video transcoding server with high performance. However, the dedicated video transcoding server is generally very expensive and may not be suitable for being widely applied. In some examples, as the quantity of videos that need to be processed increases, transcoding using one server cannot meet current requirements, and therefore, the distributed transcoding manner emerges.

In some embodiments, the distributed transcoding manner is to transcode a video file in parallel by using a plurality of transcoding servers in a distributed transcoding server cluster concurrently. First, a video file is fragmented, then video fragments obtained after the fragmentation are transmitted to different transcoding servers, and transcoding programs on the different transcoding servers are invoked for transcoding. After transcoding is complete, the transcoded video fragments are transmitted to a merging server, the merging server synthesizes the transcoded video fragments into a complete video file. Since each transcoding server transcodes the video fragment, a short time is required, and relative low requirements are imposed on a computing capability of the individual transcoding servers, and therefore, the dedicated transcoding server may be not required.

In step S102, precode the to-be-transcoded video fragment according to a precoding parameter, to obtain a first coding result (or an intermediate coding result).

For example, a transcoding method for implementing IDR alignment is provided. The IDR alignment means that IDR frames of different definitions of videos with the same content are at the same positions in terms of playing time.

In a related transcoding system, a two-phase coding manner needs to be used to implement IDR alignment coding. To be specific, first, first-phase coding is performed on a video source file according to a particular precoding parameter, which may also be referred to as precoding, to generate a first-phase output file that is a precoding result; and then when the source file is transcoded into other different definitions, second-phase coding is performed according to a coding parameter of a specified definition by using the source file and the file output after the first-phase coding, to finally output a file.

For example, the transcoding server in the distributed transcoding server cluster is to precode, according to the precoding parameter, the video fragments obtained after fragmentation. Thus, a high concurrency degree of processing of the fragment files in the distributed transcoding system is maintained. Moreover, a precoding parameter of each video fragment is determined according to attribute information of the video fragment. Therefore, the same video fragment of different definitions has the same precoding parameter even if precoded on different transcoding servers, and therefore, the same fragment of different definitions have the same result during precoding.

In step S103, code, the first precoding result according to a coding parameter corresponding to a target definition, to obtain a second coding result (or a final coding result). In an example, the second coding result is coded in the target format, for example as indicated by the target definition.

After completing precoding on the video fragments, the transcoding server can then perform the second-phase coding on the first precoding result. The coding parameter may include a parameter corresponding to the target definition, such as a code rate, a frame rate, and/or a spatial resolution, to obtain the second coding result, that is, a transcoding output file of the video fragment. Because a fragment of different definitions has the same coding result during precoding, when the second-phase coding is performed on the fragment of different definitions, IDR frames can be maintained to be aligned.

In addition, it is not the case that after a transcoding server performs precoding, a first precoding result is stored in another server for storing a coding result, and in the second-phase coding, the first precoding result needs to be obtained by re-accessing the server. Instead, the first-phase precoding and the second-phase coding are performed on a video fragment of one target definition in the same transcoding server. Therefore, processing steps are reduced, complexity of the system is reduced, and robustness of the system is improved.

In step S104, output the second coding result.

For example, the transcoding server may directly output the second coding result and time information and definition information of the second coding result to the merging server. After receiving the second coding result and determining whether the second coding results of all the video fragments of the target definition are received, the merging server merges the second coding results of all the video fragments according to the time information of the second coding results of all the video fragments, to obtain a target video file.

In one embodiment, first, any transcoding server in the distributed transcoding server cluster determines the to-be-transcoded video fragment and the attribute parameter for transcoding. The attribute parameter for transcoding includes the precoding parameter and the coding parameter corresponding to the target definition. The transcoding server precodes the to-be-transcoded video fragment according to the precoding parameter, to obtain the first coding result. The transcoding server codes the first precoding result according to the coding parameter corresponding to the target definition, to obtain the second coding result. Finally, the transcoding server outputs the second coding result. Accordingly, first-phase precoding and second-phase coding for definitions are performed on the video fragment on the same transcoding server, to obtain a transcoding result, and a plurality of transcoding servers performs precoding and coding concurrently, so that a video transcoding speed can be improved while a task processing concurrency degree is ensured, and content of different definitions of the same video are output in a IDR alignment manner.

Figure 2:
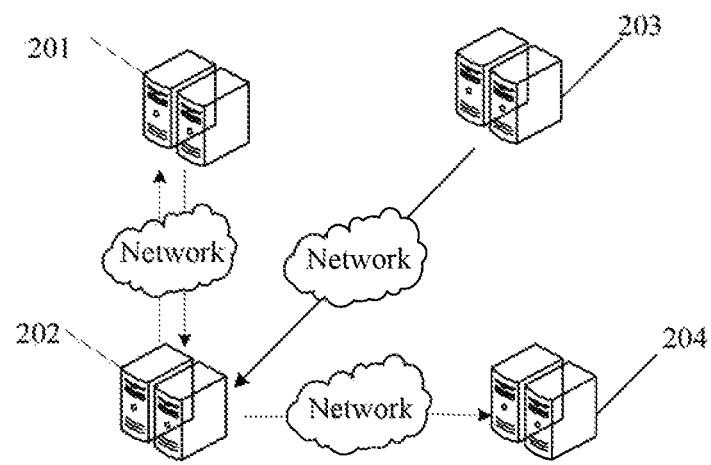
FIG. 2 is a schematic diagram of a scene of a distributed transcoding system according to an embodiment of the present disclosure.

Based on the foregoing embodiment, an embodiment of the present disclosure further provides a video transcoding method, applied to the scenario of the video transcoding system shown in FIG. 2. The distributed video transcoding system includes at least a distributed transcoding server cluster 201, a task server 202, a fragmentation server 203, and a merging server 204. The distributed transcoding server cluster 201 includes a plurality of transcoding servers, configured to transcode video files. The task server 202 is configured to generate a transcoding task based on a video fragment received from the fragmentation server 203, and generate a synthesis task based on a coding result received from the distributed transcoding server cluster 201. The fragmentation server 203 is configured to fragment a video source file that a user requests for transcoding. The merging server 204 is configured to merge and output coding results of video fragments. A network is used for data or message communication between the distributed transcoding server cluster 201 and the task server 202, the task server 202 and the fragmentation server 203, and the task server 202 and the merging server 204, and the network may be Internet or a local area network.

It may be understood that, the distributed transcoding server cluster 201, the task server 202, the fragmentation server 203, and the merging server 204 may be integrated together or disposed separately. Whichever arrangement is used, performing of the video transcoding method is not affected.

Figure 3:
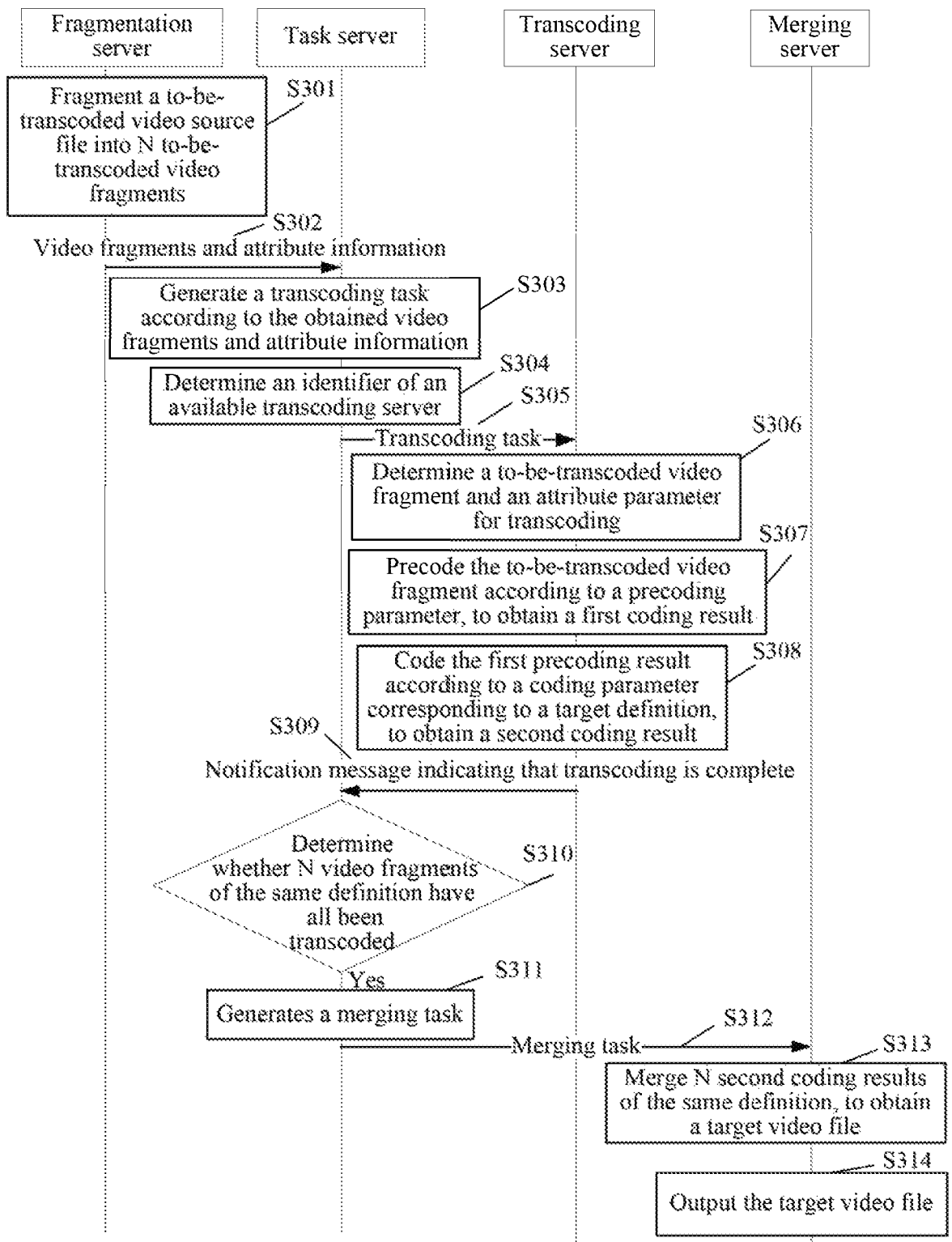
FIG. 3 is a schematic diagram of an implementation process of a video transcoding method according to an embodiment of the present disclosure.

FIG. 3 is a schematic diagram of an implementation process of a video transcoding method according to an embodiment of the present disclosure. As shown in FIG. 3, the method includes the following steps:

In step S301, a fragmentation server fragments (or divides) a to-be-transcoded video source file into N to-be-transcoded video fragments.

N is an integer greater than 1.

For example, the fragmentation server may fragment a to-be-transcoded video source file according to a preset fragment duration. To ensure that transcoding servers can complete transcoding of video fragments allocated to the transcoding servers substantially at the same time, when the fragmentation server performs fragmentation, the video source file may be evenly fragmented according to the preset fragment duration. If a total duration of the video source file is not a multiple of the preset fragment duration, a duration of each video fragment other than the last video fragment is equal to the preset fragment duration according to one embodiment.

The fragmentation server may further fragment the video source file according to a quantity of currently available transcoding machines and/or a quantity of output target video files of different code rates. During an actual implementation process, the fragmentation server may first obtain a quantity of currently available transcoding servers and/or a quantity of to-be-output target video files of different code rates. Then, the fragmentation server determines, according to the quantity of currently available transcoding servers and/or the quantity of to-be-output target video files of different code rates, a quantity N by which the video source file is fragmented. Finally, the fragmentation server fragments the video source file into N video fragments.

For example, if the fragmentation server obtains that the quantity of currently available transcoding servers is 30, and the quantity of to-be-output target video files of different code rates is 3, which respectively correspond to a standard-definition target video file, a high-definition video file, and a super-high-definition video file, to complete transcoding of the video source file into three code rates, the fragmentation server fragments the video source file into 30/3=10 fragments.

In step S302, a task server obtains a to-be-transcoded video fragment and an attribute parameter of the to-be-transcoded video fragment.

For example, after completing video fragmentation, the fragmentation server sends N video fragments and a preset target definition to the task server. In some embodiments, the task server may actively obtain the video fragments and the attribute parameter of the to-be-transcoded video fragments from the fragmentation server.

In step S303, the task server generates a transcoding task according to the obtained N to-be-transcoded video fragments and preset target definitions.

For example, the transcoding task includes the to-be-transcoded video fragment and the attribute parameter of the to-be-transcoded video fragment. The attribute parameter of the to-be-transcoded video fragment can include a precoding parameter and a coding parameter corresponding to a target definition.

For example, the fragmentation server fragments the video source file into 15 video fragments in step S301, the preset target definition includes standard definition, high definition, and super high definition, and after the task server obtains the information, the task server merges each video fragment and each target definition to generate a transcoding task. For example, a transcoding task is generated according to the first video fragment and the standard definition, a transcoding task is generated according to the first video fragment and the high definition, and a transcoding task is generated according to the first video fragment and the super high definition. A transcoding task is generated according to the second video fragment and the standard definition, a transcoding task is generated according to the second video fragment and the high definition, and a transcoding task is generated according to the second video fragment and the super high definition. A transcoding task is generated according to the $N^{th}$ video fragment and the standard definition, a transcoding task is generated according to the $N^{th}$ video fragment and the high definition, and a transcoding task is generated according to the $N^{th}$ video fragment and the super high definition. If there are 15 video fragments and three target definitions, the task server may generate 45 transcoding tasks in total. As described above, a plurality of transcoding tasks can be generated according to the N to-be-transcoded video fragments and preset target formats. For example, the preset target formats include preset target definitions such as standard definition, high definition, and super high definition.

The task server may be a transcoding server that manages other transcoding servers in the transcoding server cluster, or a fragmentation server, or a separate server different from the transcoding server and the fragmentation server.

In step S304, the task server determines an identifier of an idle transcoding server.

For example, after generating a transcoding task, the task server needs to allocate the transcoding task to the transcoding server, and in an example, a currently available transcoding server needs to be determined.

In an embodiment of the present disclosure, determining an identifier of a currently available transcoding server may include determining an identifier of a transcoding server that currently has no transcoding task.

In other embodiments, the determining an identifier of a currently available transcoding server may be implemented by using the following steps:

In step S304-a, determine an identifier of a transcoding server that has no transcoding task currently as an identifier of a currently available transcoding server.

In step S304-b, determine a remaining transcoding duration of a transcoding server that is currently performing a transcoding task.

In step S304-c if the remaining transcoding duration of the transcoding, server that is currently performing a transcoding task is less than a first preset value, determine an identifier of the transcoding server as the identifier of the currently available transcoding server.

Herein, the first preset value may be set by a developer of a system, and may be, for example, 10s and 5s.

In the embodiments of steps S304-a to S304-c, in addition to the transcoding server that has no transcoding task as the currently available transcoding server, a transcoding server that is about to complete a transcoding task can also be determined as the currently available transcoding server.

In step S305, the task server sends the transcoding task to the idle transcoding server according to the identifier of the idle transcoding server.

Herein, the task server may randomly allocate a transcoding task to the idle transcoding server, until all transcoding tasks are allocated. In addition, the task server may further add a same identifier to video fragments of the same target definition when generating transcoding tasks, and perform allocation according to the identifier when allocating the transcoding tasks. For example, an identifier 1 is added to transcoding tasks of the first video fragment, the second video fragment, . . . , and the $N^{th}$ video fragment whose target definitions are standard definition; an identifier 2 is added to transcoding tasks of the first video fragment, the second video fragment, . . . , and the $N^{th}$ video fragment whose target definitions are high definition; and an identifier 3 is added to transcoding tasks of the first video fragment, the second video fragment, . . . , and the $N^{th}$ video fragment whose target definitions are super high definition. When the transcoding tasks are allocated, the N transcoding tasks whose identifiers are 3 are first allocated, and the N transcoding tasks whose identifiers are 2 are subsequently allocated. In various embodiments, video fragments of the same target definition can be transcoded simultaneously, thereby further ensuring smooth execution of subsequent synthesis tasks.

In other embodiments, step S304 and step S305 can be omitted, and step S304 is performed. If the transcoding server satisfies a preset condition, the transcoding server obtains a transcoding task.

For example, the preset condition may be that currently the transcoding server does not have a to-be-executed transcoding task. The preset condition may alternatively be that, a remaining duration of a transcoding task that the transcoding server is currently executing is less than the first preset value.

After the task server sends a transcoding task to the transcoding server or the transcoding server actively obtains a transcoding task, the task server may delete the transcoding task.

In step S306, a transcoding server in the distributed transcoding server cluster determines the to-be-transcoded video fragment and the attribute parameter for transcoding.

Herein, after the transcoding server receives the transcoding task sent by the task server or actively obtains the transcoding task, the transcoding server parses the transcoding task to obtain the to-be-transcoded video fragment and the attribute parameter for transcoding.

In step S307, the transcoding server precodes the to-be-transcoded video fragment according to a precoding parameter, to obtain a first coding result.

In step S308, the transcoding server codes the first precoding result according to a coding parameter corresponding to a target definition, to obtain a second coding result.

For example, after precoding a video fragment, the transcoding server then performs second-phase coding on the first precoding result, to obtain the second coding result, that is, a transcoding output file of the video fragment. Because a fragment of different definitions has the same coding result during precoding, when the second-phase coding is performed on the fragment of different definitions, IDR frames can be maintained to be aligned. Accordingly, definitions of a video can be seamlessly switched between each other on various terminals.

Figure 4:
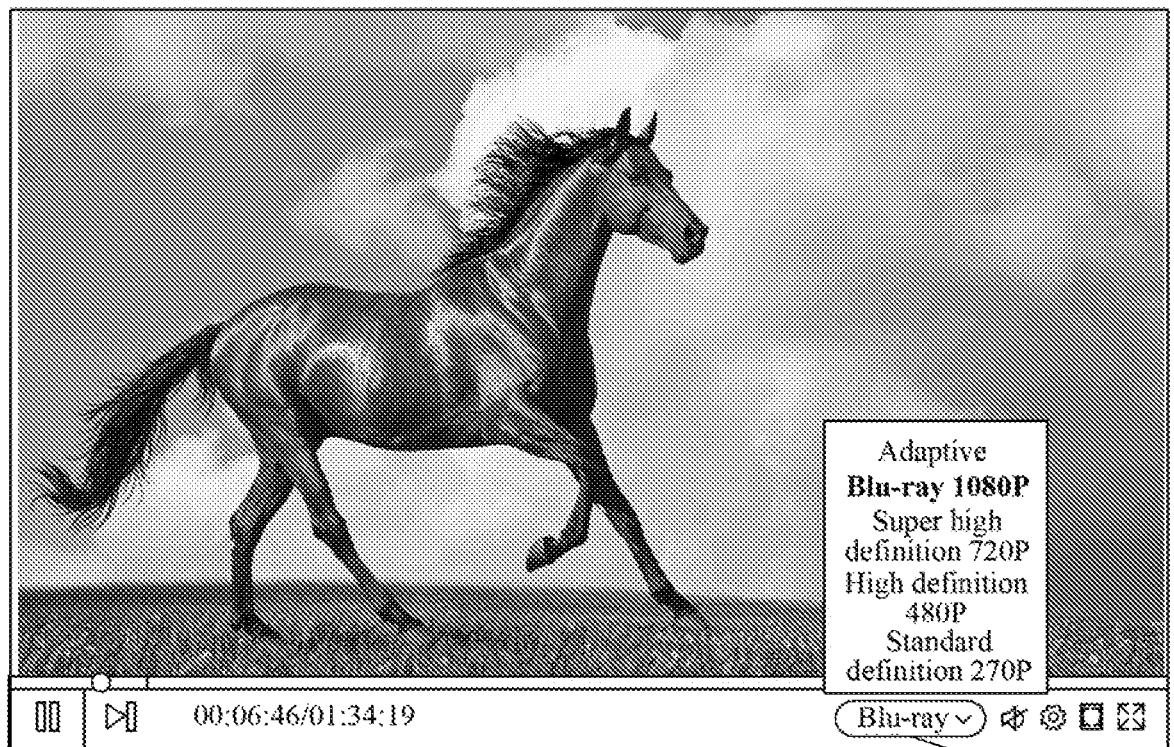
FIG. 4 is a schematic diagram of an interface of playing a video by a terminal according to an embodiment of the present disclosure.
Figure 5:
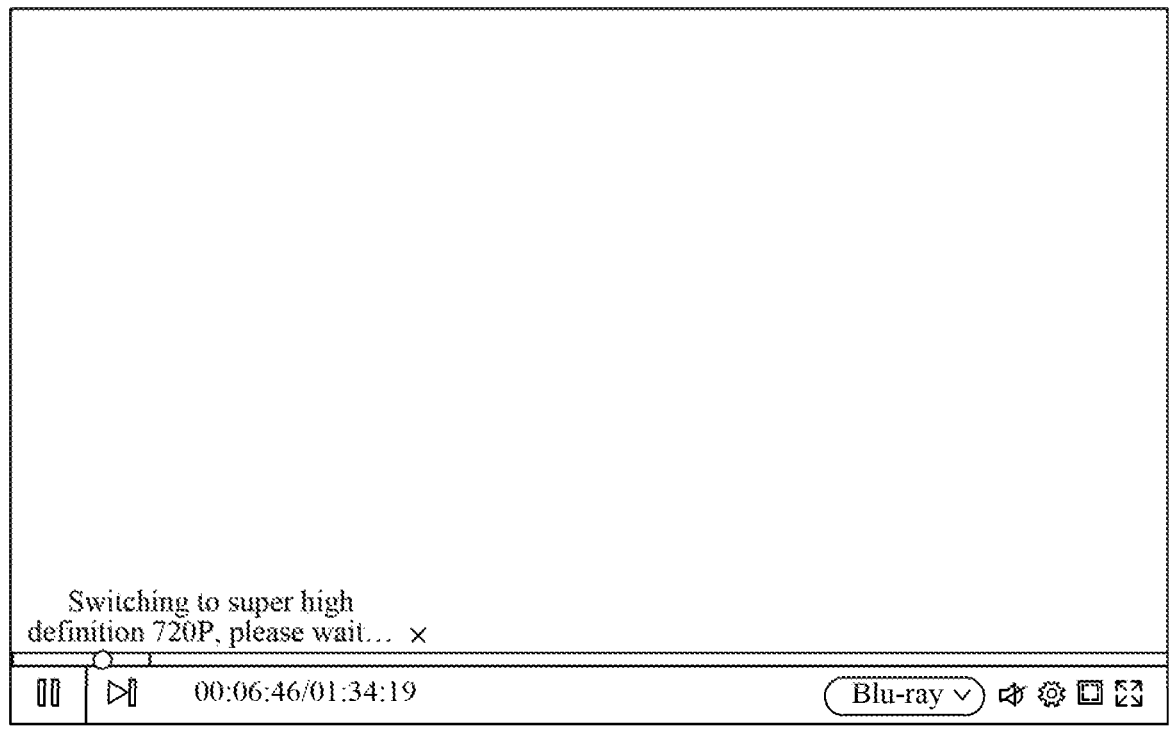
FIG. 5 is a schematic diagram of an interface of switching a resolution by a terminal according to an embodiment of the present disclosure.
Figure 6:
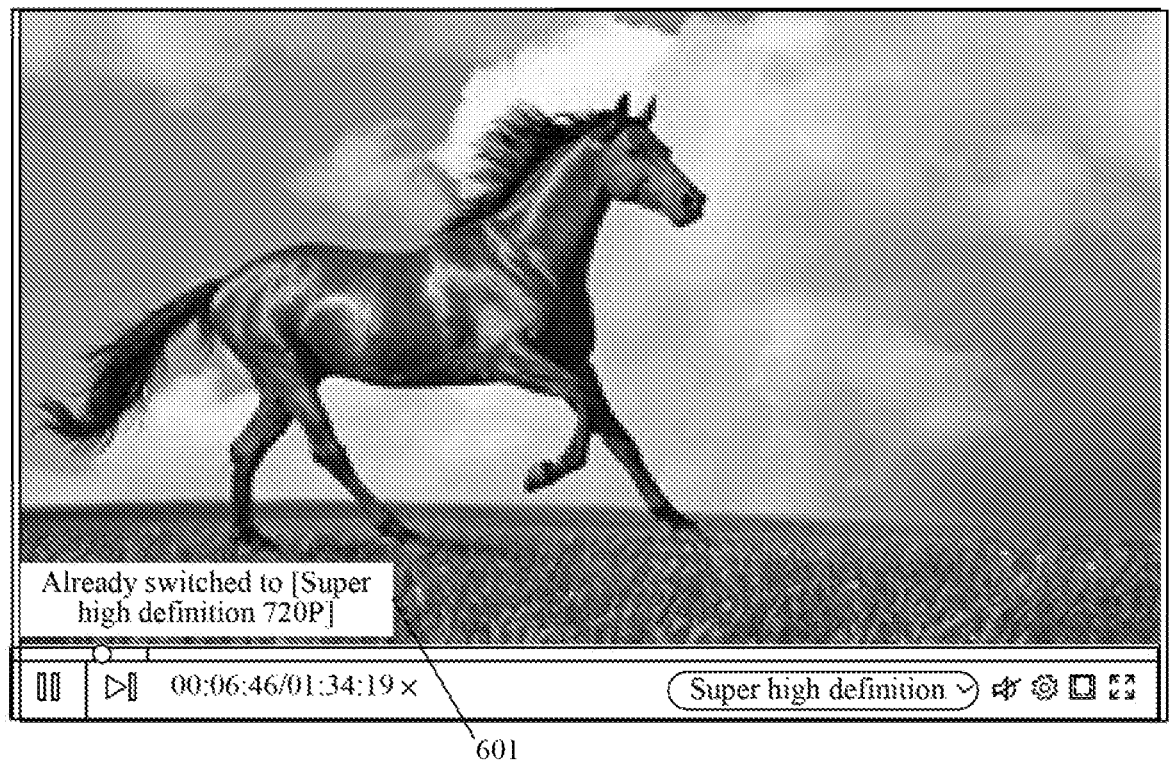
FIG. 6 is a schematic diagram of an interface of playing a video after a resolution is switched according to an embodiment of the present disclosure.

It is assumed that in a video website, there are four definition levels by default, a definition whose resolution is 270P (belonging to a standard definition level for an assumption), a definition whose resolution is 480P (belonging to a high definition level for an assumption), a definition whose resolution is 720P (belonging to a super high definition level for an assumption), and a definition whose resolution is 1080P (belonging to a blu-ray level for an assumption). It is assumed that a user A selects a blu-ray (that is, 1080P) video file for "Animal World" on the video website. FIG. 4 is a schematic diagram of an interface for playing a video by a terminal according to an embodiment of the present disclosure. As shown in FIG. 4, when the user clicks a button for definition selection in 401, various definitions that the video supports to be output are output. The video played back in FIG. 4 has a definition of blu-ray. During playback of the video file, if a freezing phenomenon occurs due to a network reason during the video play back, the currently set blu-ray play back may be manually adjusted to a lower definition (e.g., super-high-definition (that is, 720P)) playback to avoid impacting the playback progress. When the user clicks (or otherwise selects) other definitions, the definition is switched, but if IDR frames of a video file of different definitions are not aligned, a black screen shown in FIG. 5 will occur. However, since the played back video file has already been processed according to the disclosed method before being played back, positions of the IDR frames in the target, video streams after transcoding are aligned, and after the user clicks "super high definition 720P" in FIG. 4, images are still fluently played during switching of the definition. FIG. 6 is a schematic diagram of an interface of playing a video by a terminal after the definition is switched according to an embodiment of the present disclosure. As shown in FIG. 6, after switching is successfully completed, image quality turns to the adjusted definition, and an indication that the switching was successful is shown at the lower left corner 601. For videos that use IDR alignment transcoding, smooth switching can be implemented, so that the watching experience is optimized, and more fluent play back can be achieved, thereby improving user experience.

In step S309, the transcoding server sends, to the task server, a notification message indicating that transcoding is complete.

For example, the notification message carries definition information and time information of the second coding result. The time information includes start time and finish time of the second coding result. The start time and the finish time may be in a format of 0:00:00:000 (hour:minute:second:millisecond).

After the transcoding server sends the notification message, to the task server, the transcoding server may delete the first coding result and the second coding result.

In various embodiments, certain steps, such as steps S305-S309, can be implemented by different transcoding servers for different transcoding tasks that are generated for the video source file. For example, the 45 transcoding tasks generated in Step 303 can be implemented in 45 transcoding servers.

In step S310, the task server determines whether N video fragments of the same definition have all been transcoded.

For example, if the N video fragments of the same definition have all been transcoded, step S311 is performed; or if the N video fragments of the same definition have not been transcoded, no operation is performed, and the task server continues to wait for the notification message indicating that transcoding is complete.

In step S311, the task server generates a synthesis task (or a merge task).

Herein, the synthesis task includes second coding results, definition information (or format information), and time information of the N video fragments.

After receiving the second coding results of the N video fragments of the same definition (or the same format), the task server generates a synthesis task based on the second coding results and the definition information and the time information of the N video fragments. Therefore, a quantity of generated synthesis tasks depends on a quantity of preset target definitions.

In step S312, the merging server obtains the synthesis task.

Herein, the merging server may obtain a to-be-processed synthesis task by receiving the synthesis task sent by the task server, or actively obtain a synthesis task from the task server when the merging server does not have a to-be-processed synthesis task.

In step S313, the merging server merges the second coding results of the N video fragments according to the time information of the second coding results of the N video fragments, to obtain a target video file.

For example, after obtaining the synthesis task, the merging server parses the synthesis task, obtains the second coding results of the N video fragments carried in the synthesis task, and merges the N second coding results according to start time and finish time of all the second coding results, to obtain the target video file (of final target video file). In an example, the target video file is coded in the target format or the target definition.

In step S314, the merging server outputs the target video file.

For example, after outputting the target video file, the merging server may delete the synthesis task, to occupy less storage space.

In other embodiments, before step S301 of fragmenting, by a fragmentation server, a to-be-transcoded video source file into N to-be-transcoded video fragments, the method further includes:

In step 21, the fragmentation server determines a duration of a to-be-transcoded video source file.

In step 22, the fragmentation server determines whether the duration of the to-be-transcoded video source file is greater than a second preset value.

In step 23, if the duration of the to-be-transcoded video source file is greater than the second preset value, step S301 is performed; and if the duration of the to-be-transcoded video source file is not greater than the second preset value step S302 is performed.

In the embodiments of step 21 to step 22, when obtaining the to-be-transcoded video source file, the fragmentation server determines the duration of the video source file first, and if the video source file is short, for example, with a duration of 2 minutes, the video source file does not need to be fragmented, and is handed over to the task server directly to generate a transcoding task.

In other embodiments, before step S301, the method further includes: receiving a setting operation, where the setting operation is used to set the fragment duration and different definition levels; and determining corresponding target definitions according to different definition levels.

In other embodiments, step S303 of generating, by the task server, a transcoding task according to obtained N to-be-transcoded video fragments and a preset target definition may be implemented through the following steps:

In step S303-a, the task server determines a precoding parameter of the to-be-transcoded video fragment according to an identifier of the to-be-transcoded video fragment.

For example, precoding parameters of video fragments located at different positions in the video source file are different. For example, a precoding parameter in the first video fragment includes a video opening-credit file, a precoding parameter in the last video fragment includes a video closing-credit file, and an intermediate video fragment includes an interstitial advertisement video file. Therefore, a precoding parameter of each video fragment needs to be determined according to an identifier of the video fragment.

In step S303-b, the task server determines a coding parameter corresponding to the target definition according to the preset target definition.

For example, each definition (or referred to as a definition level) corresponds to one or more coding parameters. The task server may determine the coding parameter corresponding to the target definition by querying a correspondence between a preset definition and the coding parameter. The coding parameter corresponding to the target definition includes at least a code rate corresponding to the target definition, and may further include a frame rate and a resolution corresponding to the target definition.

For example, for a video file whose coding standard is H.264, a code rate corresponding to a high definition may be 1800 kbps, a frame rate may be 25 frames per second (frame per second, fps), and a resolution is 720*576 pixels; a code rate corresponding to a super high definition may be 3500 kbps, a frame rate may be 35 fps, and a resolution may be 1280*720 pixels; and a code rate corresponding to a blu-ray definition may be 8500 kbps, a frame rate may be 50 fps, and a resolution may be 1920*1080 pixels.

In step S303-c, the task server generates a transcoding task according to the precoding parameter, the coding parameter corresponding to the target definition, and the to-be-transcoded video fragment.

In other embodiments, step S303a of determining, by the task server, a precoding parameter of the to-be-transcoded video fragment according to an identifier of the to-be-transcoded video fragment may include the following steps:

In step S303-a1, the task server determines position information of the to-be-transcoded video fragment in the to-be-transcoded video source file according to an identifier of the to-be-transcoded video fragment.

In step S303-a2, the task server determines the precoding parameter of the to-be-transcoded video fragment according to the position information.

In other embodiments, the determining, by the task server, the precoding parameter of the to-be-transcoded video fragment according to the position information includes:

In step 11, the task server obtains a precoding code rate and a customized parameter for precoding the to-be-transcoded video source file, where the customized parameter includes a video opening-credit file, a video closing-credit file, and watermark information.

The customized parameter may be set by a person that posts the video file, and the customized parameter may further include marquee information, blocking information, an interstitial advertisement video file, and the like.

In step 12, determine the precoding code rate, the video opening-credit file, and the watermark information as the precoding parameter of the to-be-transcoded video fragment, if the task server determines according to the position information that the to-be-transcoded video fragment is the first fragment.

In step 13, determine the precoding code rate, the video closing-credit file, and the watermark information as the precoding parameter of the to-be-transcoded video fragment, if the task server determines according to the position information that the to-be-transcoded video fragment is the last fragment.

In step 14, determine the precoding code rate and the watermark information as the precoding parameter of the to-be-transcoded video fragment, if the task server determines according to the position information that the to-be-transcoded video fragment is neither the first nor the last fragment.

For example, in the video transcoding method, the fragmentation server first fragments a video source file; then, the task server generates a transcoding task according to video fragments; and after the transcoding server in the distributed transcoding server cluster obtains the transcoding task, the transcoding server precodes the video fragment in the transcoding task according to the precoding parameter, to obtain a first coding result. The transcoding server codes the first precoding result according to a coding parameter corresponding to a target definition, to obtain a second coding result and send a notification message to the task server. After determining that N video fragments of the same definition have been transcoded, the task server generates a synthesis task, and after obtaining the synthesis task, the merging server synthesizes second coding results of the N video fragments, to finally obtain a target video file. Accordingly, first-phase precoding and second-phase coding for definitions are performed on the video fragment on the same transcoding server, to obtain a transcoding result, and a plurality of transcoding servers performs precoding and coding concurrently, so that a task processing concurrency degree is ensured, a video transcoding speed can be improved, and content of different definitions of the same video are output in a IDR alignment manner.

In some embodiments, if the same algorithm is executed for the same inputs, the obtained results are also the same. This feature implements a simple and reliable IDR alignment transcoding method in a distributed transcoding system. The video transcoding method includes, for example, the following steps:

In step 1, after obtaining a video source file, a task access machine fragments the video source file.

For example, to ensure that a plurality of transcoding machines can complete transcoding simultaneously, when the task access machine fragments the video source file, the task access machine generally fragments the video source file into fragments of a same duration. During actual implementation, the task access machine may first obtain a total duration of the video source file, and then fragment the video source file into N fragments according to a fragment duration (e.g., a preset fragment duration). For example, when a total duration of the to-be-transcoded video source file is 55 minutes and the fragment duration is 5 minutes, the video source file can be fragmented into 11 fragments (that is, N is equal to 11). Moreover, to ensure that all fragments can be successfully or normally transcoded, coding and decoding of the fragments are independent of each other, that is, the video source file is fragmented into a plurality of independent fragments, and the fragments are not directly associated with each other.

In one embodiment of the present disclosure, it is assumed that definitions of M levels need to be output. M is an integer greater than or equal to 1. In other embodiments, the definition levels include but are not limited to standard definition, high definition, and super high definition. For example, when M=2, two definition levels of high definition and super high definition may be output.

In other embodiments, all to-be-transcoded video files may be stored in a first queue. For example, the first queue may be a "to-be-transcoded video file queue", and the task access machine may extract a corresponding to-be-transcoded video file from the first queue according to the preset order, and fragment the to-be-transcoded video file. For example, the task access machine extracts a corresponding video file according to a position order of the video file in the first queue, or extracts a corresponding video file according to a time order of the video file stored in the first queue.

In step 2, the task access machine stores N fragments in a second queue.

For example, the second queue may be a "fragment video file queue". Since videos of a plurality of definitions need to be output, when the N fragments are stored in the second queue, each piece of identification information, that is, a definition, may be added for each stored fragment. That is, before the N fragments are stored, a first fragment of a first definition, a second fragment of the first definition, . . . , a $N^{th}$ fragment of the first definition, a first fragment of a second definition, a second fragment of the second definition, . . . , a $N^{th}$ fragment of the second definition, . . . , a first fragment of an $M^{th}$ definition, a second fragment of the $M^{th}$ definition, . . . , and a $N^{th}$ fragment of the $M^{th}$ definition are sequentially stored.

In step 3, the task access machine determines identification information of an idle transcoding machine.

In step 4, the task access machine allocates a fragment for each idle transcoding machine from the second queue.

In step 5, a $j^{th}$ transcoding machine obtains a first coding parameter and a second coding parameter of a $k^{th}$ to-be-transcoded fragment.

For example, j is an integer between 1 to p, p is a quantity of idle transcoding machines, and k is an integer between 1 to M*N. The first coding parameter may include but is not limited to: a first target code rate, a marquee parameter, and a watermark parameter. The marquee parameter may include: a marquee file path, a number, a marquee position, and a marquee cyclic policy. The watermark parameter may include: an added watermark file number, a file path, and position information.

The second coding parameter is a coding parameter corresponding to a definition. For example, if a to-be-transcoded fragment needs to be transcoded into a high-definition video, the second coding parameter is a target code rate corresponding to high definition.

In an embodiment of the present disclosure, the first coding parameter is the same for all fragments, and therefore, the first coding parameter may be directly obtained from the task access machine. The second coding parameter is a coding parameter corresponding to a definition. When obtaining the second coding parameter, definition information in identification information of a $k^{th}$ to-be-transcoded fragment may be obtained first according to the identification information of the $k^{th}$ to-be-transcoded fragment, and then the corresponding second coding parameter may be obtained by using the definition information.

For example, the definition information in the identification information of the $k^{th}$ to-be-transcoded fragment is the super high definition, the transcoding machine may determine a target code rate corresponding to the super high definition by using a table of correspondences between definitions and target code rates, and determine the target code rate as the second coding parameter.

In step 6, a $j^{th}$ transcoding machine codes the $k^{th}$ to-be-transcoded fragment according to the first coding parameter, to obtain a first coding result.

In step 7, the $j^{th}$ transcoding machine codes the $k^{th}$ to-be-transcoded fragment according to the second coding parameter and the first coding result, to obtain a transcoding output result of the $k^{th}$ to-be-transcoded fragment.

For example, video transcoding, that is, video conversion transcoding, refers to conversion of a video from a coding/encapsulation format to another coding/encapsulation format. The referred format includes a code rate, a frame rate, a spatial resolution, a container type for encapsulating a video, and a used coding algorithm.

Further, transcoding a fragment means decoding a fragment and then coding the fragment in some examples. Specifically, the transcoding machine first reads a video stream segment, then calls a video decoder to decode a fragment to obtain an unencoded fragment, and calls a video coder to code the fragment to obtain a transcoded fragment. Accordingly, a code or format of a fragment is converted into another code or another encapsulation format.

A first transcoding machine to a $p^{th}$ transcoding machine perform step 5 and step 6 concurrently.

In step 8, the $j^{th}$ transcoding machine sends the transcoding output result of the $k^{th}$ to-be-transcoded fragment to a merging machine.

In step 9, the task access machine determines whether the second queue is empty.

Herein, if the second queue is empty, it indicates that all fragments have been transcoded, and step 10 is performed. If the second queue is not empty, it indicates that there is fragment that has not been transcoded, and step 3 is performed.

In step 10, the merging machine merges received transcoding output results, to obtain a transcoded video file.

For example, the merging machine may first group transcoding output results according to the definition information carried in the transcoding output results, and group transcoding output results belonging to the same definition to one group, and then merge the transcoding output results of the fragments according to start time and finish time of the transcoding output results, to further obtain transcoded video files of all definitions.

The task access machine may be a fragmentation server or a task server in other embodiments. The transcoding machine is a transcoding server in other embodiments. The merging machine is a merging server in other embodiments.

In some embodiments of the present disclosure, first, the task access machine fragments a to-be-transcoded video source file; and then, for processing of an $i^{th}$ fragment, a machine that outputs a $j^{th}$ definition obtains a source file and uses a first-phase coding parameter P1 for first-phase coding, to obtain output content L1 after completion. Then, on the same machine, a source file of the $i^{th}$ fragment, a coding parameter of the $j^{th}$ definition, and the output content L1 are used as an input for coding performed by a coding tool, to obtain a transcoding output file of the $i^{th}$ fragment. The foregoing processing is performed for N fragments of m definitions. Accordingly, for any fragment, output videos of different definitions are in IDR alignment. Finally, all fragments of the $j^{th}$ definition are merged, that is, the transcoded output files of the $j^{th}$ definition are obtained, and transcoded output files of other definitions are in IDR alignment.

Figure 7:
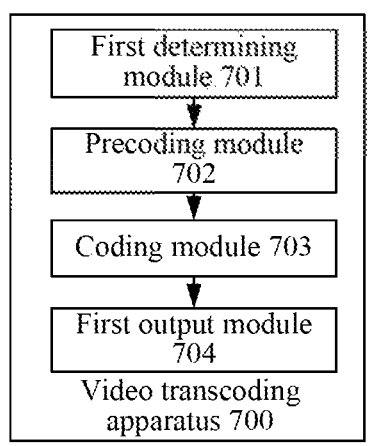
FIG. 7 is a schematic diagram of a composition structure of a video transcoding apparatus according to an embodiment of the present disclosure.

Based on the foregoing embodiments, an embodiment of the present disclosure provides a video transcoding apparatus. FIG. 7 is a schematic diagram of a composition structure of the video transcoding apparatus according to an embodiment of the present disclosure. As shown in FIG. 7, the apparatus 700 includes at least one memory and at least one processor. The at least one memory stores at least one instruction module configured to be executed by the at least one processor. The at least one instruction module includes: a first determining module 701, a precoding module 702, a coding module 703, and a first output module 704.

The first determining module 701 is configured to determine a to-be-transcoded video fragment and an attribute parameter for transcoding, the attribute parameter for transcoding including a precoding parameter and a coding parameter corresponding to a target definition.

The precoding module 702 is configured to precode the to-be-transcoded video fragment according to the precoding parameter, to obtain a first coding result.

The coding module 703 is configured to code the first precoding result according to the coding parameter corresponding to the target definition, to obtain a second coding result.

The first output module 704 is configured to output the second coding result.

In another embodiment of the present disclosure, the apparatus further includes:
  a fragmentation module, configured to fragment a to-be-transcoded video source file into N to-be-transcoded video fragments, N being an integer greater than 1;
  a first generation module, configured to generate a transcoding task according to the N to-be-transcoded video fragments and a preset the target definition, the transcoding task including the to-be-transcoded video fragment and the attribute parameter for transcoding; and
  a first obtaining module, configured to obtain the transcoding task if the first obtaining module satisfies a preset condition.

In another embodiment of the present disclosure, the apparatus further includes:
  a second generation module, configured to generate, by the server, a synthesis task if N video fragments of the same definition have all been transcoded, the synthesis task including second coding results, definition information, and time information of the N video fragments.

In another embodiment of the present disclosure, the apparatus further includes:
  a second obtaining module, configured to obtain a synthesis task;
  a merging module, configured to merge the second coding results of the N video fragments according to the time information of the second coding results of the N video fragments, to obtain a target video file; and
  a second output module, configured to output the target video file.

In another embodiment of the present disclosure, the first generation module includes:
  a first determining unit, configured to determine the precoding parameter of the to-be-transcoded video fragment according to an identifier of the to-be-transcoded video fragment;
  a second determining unit, configured to determine the coding parameter corresponding to the target definition according to the preset target definition; and
  a first generation unit, configured to generate the transcoding task according to the precoding parameter, the coding parameter corresponding to the target definition, and the to-be-transcoded video fragment.

In another embodiment of the present disclosure, the first determining unit includes:
  a first determining subunit, configured to determine position information of the to-be-transcoded video fragment in the to-be-transcoded video source file according to the identifier of the to-be-transcoded video fragment; and
  a second determining subunit, configured to determine the precoding parameter of the to-be-transcoded video fragment according to the position information.

In another embodiment of the present disclosure, the first determining subunit is further configured to:
  obtain a precoding code rate and a customized parameter for precoding a to-be-transcoded video source file, the customized parameter including a video opening-credit file, a video closing-credit file, and watermark information; and
  determine the precoding code rate, the video opening-credit file, and the watermark information as the precoding parameter of the to-be-transcoded video fragment, if it is determined according to the position information that the to-be-transcoded video fragment is a first fragment.

In another embodiment of the present disclosure, the first determining subunit is further configured to:
  determine the precoding code rate, the video closing-credit file, and the watermark information as the precoding parameter of the to-be-transcoded video fragment, if it is determined according to the position information that the to-be-transcoded video fragment is the last fragment; and
  determine the precoding code rate and the watermark information as the precoding parameter of the to-be-transcoded video fragment, if it is determined according to the position information that the to-be-transcoded video fragment is neither the first fragment nor the last fragment.

Descriptions of the foregoing apparatus embodiments are similar to the descriptions of the method embodiments. The apparatus embodiments have beneficial effects similar to those of the method embodiments and thus are not repeatedly described. For technical details that are not disclosed in the apparatus embodiments of the present disclosure, refer to the descriptions of the method embodiments of the present disclosure for understanding.

Figure 8:
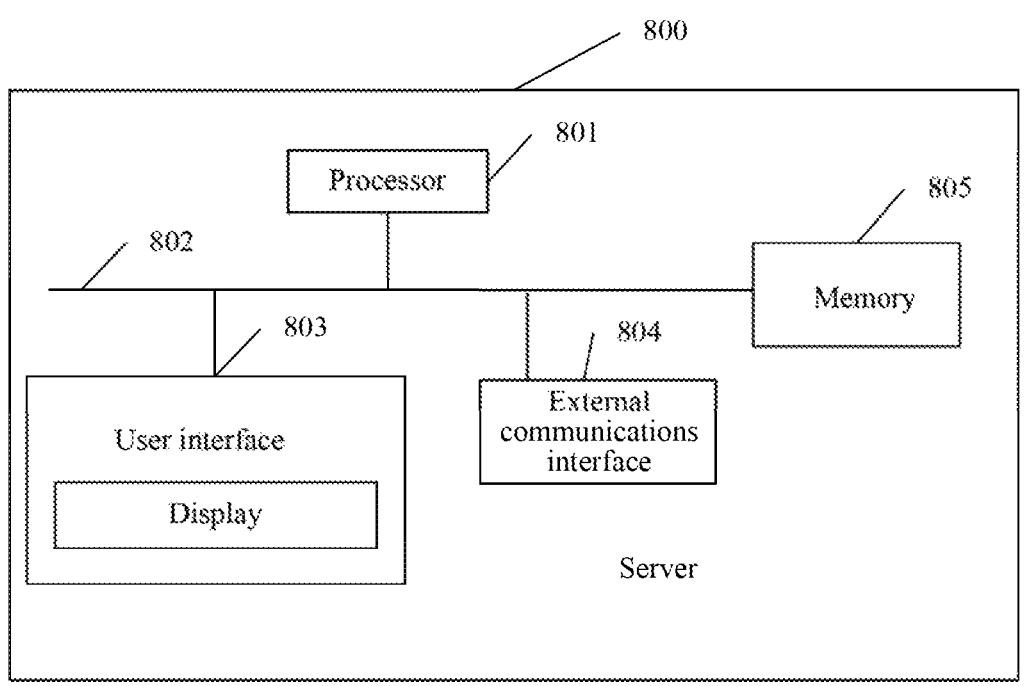
FIG. 8 is a schematic diagram of a composition structure of a server according to an embodiment of the present disclosure.

Based on the foregoing embodiments, an embodiment of the present disclosure provides a server. FIG. 8 is a schematic diagram of a composition structure of the server according to an embodiment of the present disclosure. As shown in FIG. 8, the server 800 may include: at least one processor 801, at least one communications bus 802, a user interface 803, at least one external communications interface 804, and a memory 805. The communications bus 802 is configured to implement connection communication between the components. The user interface 803 may include a display, and the external communications interface 804 may further include a standard wired interface and wireless interface. The processor 801 is configured to:

determine a to-be-transcoded video fragment and an attribute parameter corresponding to the to-be-transcoded video fragment, the attribute parameter including a precoding parameter and a coding parameter corresponding to a target definition;

precode the to-be-transcoded video fragment according to the precoding parameter, to obtain a first coding result;

code the first precoding result according to the coding parameter corresponding to the target definition, to obtain a second coding result; and output the second coding result.

In the embodiments of the present disclosure, if implemented in the form of software functional modules and sold or used as independent products, the video transcoding method may be stored in a computer-readable storage medium. Based on such an understanding, the technical solutions of the embodiments of the present disclosure essentially, or the part contributing to the prior art may be implemented in a form of a software product. The computer software product is stored in a storage medium and includes several instructions for instructing a computer device (which may be a personal computer, a server, a network device, or the like) to perform all or some of the methods described in the embodiments of the present disclosure. The foregoing storage medium includes: any medium that can store program code, such as a USB flash drive, a removable hard disk, a read-only memory (ROM), a random access memory (RAM), a magnetic disk, or a compact disc. Accordingly, the embodiments of the present disclosure are not limited to any specific combination of hardware and software.

An embodiment of the present disclosure provides a computer storage medium, the computer storage medium storing a computer executable instruction, and the computer executable instruction being configured to perform the foregoing video transcoding method provided in the embodiments of the present disclosure.

It should be understood that "an embodiment" or "embodiment one" mentioned throughout the specification means that specific characteristics, structures or properties relevant to the embodiments are included in at least one embodiment of the present disclosure. Therefore, "in an embodiment" or "in embodiment one" occurs in everywhere throughout the specification may not necessarily refer to the same embodiment. In addition, these specific features, structures, or properties may be merged in one or more embodiments in any proper manner. It should be understood that sequence numbers of the foregoing processes do not mean execution sequences in various embodiments of the present disclosure. The execution sequences of the processes can be determined according to functions and internal logic of the processes, and should not be construed as any limitation on the implementation processes of the embodiments of the present disclosure. The sequence numbers of the foregoing embodiments of the present disclosure are merely for illustrative purposes, and are not intended to indicate priorities of the embodiments.

It should be noted that the terms "include", "comprise", or any other variation thereof in the disclosure is intended to cover a non-exclusive inclusion, which specifies the presence of stated processes, methods, objects, or apparatuses, but do not preclude the presence or addition of one or more other processes, methods, objects, or apparatuses. Without more limitations, elements defined by the sentence "including one" does not exclude that there are still other same elements in the processes, methods, objects, or apparatuses.

In the embodiments provided in the disclosure, it should be understood that the disclosed device and method may be implemented in other manners. The described device embodiments are merely examples. For example, the unit division is merely logical function division and may be other division during actual implementation. For example, multiple units or components may be merged or integrated into another system, or some features may be ignored or not performed. In addition, the displayed or discussed mutual couplings or direct couplings or communication connections between the components may be implemented through some interfaces, indirect couplings or communication connections between the devices or units, or electrical connections, mechanical connections, or connections in other forms.

The units described as separation parts may be or may not be physically separated. The part used as display unit may be or may not be a physical unit. That is, the units may be located in the same place, or may be distributed to many network units. Some or all of the units need to be selected according to actual requirements to implement the purpose of the solution of the embodiments.

In addition, functional units in the embodiments of the present disclosure may be all integrated in a second processing unit, each unit is separately used as a unit, or two or more units are integrated in a unit. The integrated unit may be implemented in a form of hardware, or may be implemented in form of hardware plus a software functional unit.

A person of ordinary skill in the art may understand that all or a part of the steps of the method embodiments may be implemented by a program instructing relevant hardware. The program may be stored in a computer readable storage medium (e.g., a non-transitory computer readable storage medium). When the program runs, the steps of the method embodiments are performed. The foregoing storage medium includes: any medium that can store program code, such as a portable storage device, a ROM, a RAM, a magnetic disk, or a compact disc.

Alternatively, in the present disclosure, if implemented in the form of software functional modules and sold or used as independent products, the integrated modules may be stored in a computer-readable storage medium. Based on such an understanding, the technical solutions of the embodiments of the present disclosure may be implemented in a form of a software product. The computer software product is stored in a storage medium and includes several instructions for instructing a computer device (which may be a personal computer, a server, a network device, or the like) to perform all or some of the methods described in the embodiments of the present disclosure. The foregoing storage medium includes: any media that can store program code, such as a portable storage device, a ROM, a magnetic disk, or a compact disc.

The descriptions are only exemplary implementations of the present disclosure, but are not intended to limit the protection scope of the present disclosure. Any variation or replacement readily figured out by persons skilled in the art within the technical scope disclosed in the present disclosure shall fall within the protection scope of the present disclosure.

What is claimed is:

1. A method for transcoding a video source file into multiple target formats, comprising:

dividing the video source file into multiple video chunks that include the first video chunk;

generating a plurality of transcoding tasks according to the multiple video chunks and the multiple target formats, each of the plurality of transcoding tasks being for transcoding one of the multiple video chunks according to corresponding attribute parameters that correspond to the one of the multiple video chunks and one of the multiple target formats, the corresponding attribute parameters including a corresponding precoding parameter for each of the multiple video chunks, wherein each of the multiple video chunks have independently settable precoding parameters;

receiving, by a first server implemented by processing circuitry of a server system, a first video chunk of the multiple video chunks and first attribute parameters corresponding to the first video chunk and a first target format of the multiple target formats, the first attribute parameters including a first precoding parameter for the first video chunk and a first coding parameter for the first target format, the first video chunk to be transcoded into the first target format;

processing, by the first server, the first video chunk based on the first precoding parameter for the first video chunk to generate a first intermediate coding result used to generate the multiple target formats of the first video chunk;

after processing the first video chunk according to the first precoding parameter, coding, by the first server, the first intermediate coding result according to the first coding parameter for the first target format to obtain a first final coding result in the first target format; and outputting the first final coding result.

2. The method according to claim 1, further comprising:
receiving, by a second server implemented by the processing circuitry, a second video chunk of the multiple video chunks and second attribute parameters of the attribute parameters corresponding to the second video chunk and the first target format, the second attribute parameters including a second precoding parameter for the second video chunk and the first coding parameter for the first target format, the second video chunk to be transcoded into the first target format;

processing, by the second server, the second video chunk according to the second precoding parameter for the second video chunk to obtain a second intermediate coding result;

coding, by the second server, the second intermediate coding result according to the first coding parameter for the first target format to obtain a second final coding result; and outputting the second final coding result.

3. The method according to claim 1, further comprising:
receiving, by a second server implemented by the processing circuitry, the first video chunk and second attribute parameters corresponding to the first video chunk and a second target format of the multiple target formats, the second attribute parameters including the first precoding parameter for the first video chunk and a second coding parameter for the second target format, the first video chunk to be transcoded into the second target format;

processing, by the second server, the first video chunk according to the first precoding parameter for the first video chunk to obtain the first intermediate coding result;

coding, by the second server, the first intermediate coding result according to the second coding parameter for the second target format to obtain a second final coding result; and outputting the second final coding result.

4. The method according to claim 2, further comprising:
generating a merging task when the multiple video chunks have been transcoded according to the first target format, the merging task including final coding results corresponding to the first target format, target format information of the first target format, and time information of the multiple video chunks, the final coding results including the first final coding result and the second final coding result.

5. The method according to claim 4, further comprising:
receiving the merging task;
merging the final coding results according to the time information to obtain a target video file in the first target format; and
outputting the target video file.

6. The method according to claim 1, wherein the generating the plurality of transcoding tasks comprises:
determining the corresponding precoding parameter for each of the multiple video chunks according to an identifier of the respective video chunk;
determining a coding parameter for each of the multiple target formats according to the respective target format; and
generating each of the plurality of transcoding tasks according to the corresponding precoding parameter, the coding parameter corresponding to the respective target format, and the respective video chunk.

7. The method according to claim 6, wherein the determining the precoding parameter comprises:
determining position information of the respective video chunk in the video source file according to the identifier of the respective video chunk; and
determining the corresponding precoding parameter of the respective video chunk according to the position information.

8. The method according to claim 7, wherein the determining the corresponding precoding parameter according to the position information comprises:
obtaining a precoding code rate and a customized parameter for processing the video source file, the customized parameter including at least one of a video opening-credit file, a video closing-credit file, and watermark information.

9. The method according to claim 8, wherein the determining the corresponding precoding parameter according to the position information further comprises:
determining the precoding code rate, the video opening-credit file, and the watermark information as the corresponding precoding parameter of the respective video chunk when the respective video chunk is determined to be the first of the multiple video chunks according to the position information;
determining the precoding code rate, the video closing-credit file, and the watermark information as the corresponding precoding parameter of the respective video chunk when the respective video chunk is determined to be the last of the multiple video chunks according to the position information; and
determining the precoding code rate and the watermark information as the corresponding precoding parameter of the respective video chunk when the respective video chunk is determined not to be the first or the last of the multiple video chunks according to the position information.

10. A server system for transcoding a video source file into multiple target formats, comprising:
processing circuitry configured to implement a first server that is configured to:
divide the video source file into multiple video chunks that include the first video chunk;
generate a plurality of transcoding tasks according to the multiple video chunks and the multiple target formats, each of the plurality of transcoding tasks being for transcoding one of the multiple video chunks according to corresponding attribute parameters that correspond to the one of the multiple video chunks and one of the multiple target formats, the corresponding attribute parameters including a corresponding precoding parameter for each of the multiple video chunks, wherein each of the multiple video chunks have independently settable precoding parameters;
receive a first video chunk of the multiple video chunks and first attribute parameters corresponding to the first video chunk and a first target format of the multiple target formats, the first attribute parameters including a first precoding parameter for the first video chunk and a first coding parameter for the first target format, the first video chunk to be transcoded into the first target format;
process the first video chunk based on the first precoding parameter for the first video chunk to generate a first intermediate coding result used to generate the multiple target formats of the first video chunk;
after processing the first video chunk according to the first precoding parameter, code the first intermediate coding result according to the first coding parameter for the first target format to obtain a first final coding result in the first target format; and
output the first final coding result.

11. The server system according to claim 10, wherein the processing circuitry is further configured to implement a second server that is configured to:
receive a second video chunk of the multiple video chunks and second attribute parameters of the attribute parameters corresponding to the second video chunk and the first target format, the second attribute parameters including a second precoding parameter for the second video chunk and the first coding parameter for the first target format, the second video chunk to be transcoded into the first target format;
process the second video chunk according to the second precoding parameter for the second video chunk to obtain a second intermediate coding result;
code the second intermediate coding result according to the first coding parameter for the first target format to obtain a second final coding result; and
output the second final coding result.

12. The server system according to claim 10, wherein the processing circuitry is further configured to implement a second server that is configured to:
receive the first video chunk and second attribute parameters corresponding to the first video chunk and a second target format of the multiple target formats, the second attribute parameters including the first precoding parameter for the first video chunk and a second coding parameter for the second target format, the first video chunk to be transcoded into the second target format;
process the first video chunk according to the first precoding parameter for the first video chunk to obtain the first intermediate coding result;
code the first intermediate coding result according to the second coding parameter for the second target format to obtain a second final coding result; and
output the second final coding result.

13. The server system according to claim 11, wherein the processing circuitry is further configured to:
generate a merging task when the multiple video chunks have been transcoded according to the first target format, the merging task including final coding results corresponding to the first target format, target format information of the first target format, and time information of the multiple video chunks, the final coding results including the first final coding result and the second final coding result.

14. The server system according to claim 13, wherein the processing circuitry is further configured to:
receive the merging task;
merge the final coding results according to the time information to obtain a target video file in the first target format; and
output the target video file.

15. The server system according to claim 10, wherein the processing circuitry is further configured to:
determine the corresponding precoding parameter for each of the multiple video chunks according to an identifier of the respective video chunk;
determine a coding parameter for each of the multiple target formats according to the respective target format; and
generate each of the plurality of transcoding tasks according to the corresponding precoding parameter, the coding parameter corresponding to the respective target format, and the respective video chunk.

16. The server system according to claim 15, wherein the processing circuitry is further configured to:
determine position information of the respective video chunk in the video source file according to the identifier of the respective video chunk; and
determine the corresponding precoding parameter of the respective video chunk according to the position information.

17. The server system according to claim 16, wherein the processing circuitry is further configured to:
obtain a precoding code rate and a customized parameter for processing the video source file, the customized parameter including at least one of a video opening-credit file, a video closing-credit file, and watermark information.

18. A non-transitory computer-readable storage medium storing a program executable by one or more processors to perform:
dividing the video source file into multiple video chunks that include the first video chunk;
generating a plurality of transcoding tasks according to the multiple video chunks and the multiple target formats, each of the plurality of transcoding tasks being for transcoding one of the multiple video chunks according to corresponding attribute parameters that correspond to the one of the multiple video chunks and one of the multiple target formats, the corresponding attribute parameters including a corresponding precoding parameter for each of the multiple video chunks, wherein two of the multiple video chunks have different precoding parameters;

receiving a first video chunk of the multiple video chunks and first attribute parameters corresponding to the first video chunk and a first target format of multiple target formats, the first attribute parameters including a first precoding parameter for the first video chunk and a first coding parameter for the first target format, the first video chunk to be transcoded into the first target format;

processing the first video chunk based on the first precoding parameter for the first video chunk to generate a first intermediate coding result used to generate the multiple target formats of the first video chunk;

after processing the first video chunk according to the first precoding parameter, coding the first intermediate coding result according to the first coding parameter for the first target format to obtain a first final coding result in the first target format; and outputting the first final coding result.

* * * * *